US012573685B2

(12) United States Patent
Salim Shirazy et al.

(10) Patent No.: US 12,573,685 B2
(45) Date of Patent: Mar. 10, 2026

(54) BATTERY WITH THERMAL SWITCH

(71) Applicant: 9351-0618 QUEBEC INC., Sherbrooke (CA)

(72) Inventors: Mahmoodreza Salim Shirazy, Boucherville (CA); Luc Frechette, Sherbrooke (CA)

(73) Assignee: 9351-0618 QUÉBEC INC., Sherbrooke (CA)

( * ) Notice: Subject to any disclaimer, the term of this patent is extended or adjusted under 35 U.S.C. 154(b) by 1013 days.

(21) Appl. No.: 17/654,169

(22) Filed: Mar. 9, 2022

(65) Prior Publication Data

US 2022/0294050 A1 Sep. 15, 2022

Related U.S. Application Data

(60) Provisional application No. 63/158,612, filed on Mar. 9, 2021.

(51) Int. Cl.
*H01M 10/6554* (2014.01)
*H01M 10/613* (2014.01)
(Continued)

(52) U.S. Cl.
CPC ..... *H01M 10/6554* (2015.04); *H01M 10/613* (2015.04); *H01M 10/625* (2015.04); *H01M 10/63* (2015.04); *H01M 2220/20* (2013.01)

(58) Field of Classification Search
CPC ........... H01M 10/6554; H01M 10/613; H01M 10/625; H01M 10/63; H01M 2220/20;
(Continued)

(56) References Cited

U.S. PATENT DOCUMENTS 5,957,408 A 9/1999 Hall et al.
9,160,038 B2 10/2015 Buck et al.
(Continued)

FOREIGN PATENT DOCUMENTS

CN 108470861 A * 8/2018 ............ H01M 50/20
CN 108520987 A * 9/2018 .......... H01M 10/613
(Continued)

*Primary Examiner* — Kaity V Chandler
(74) *Attorney, Agent, or Firm* — NORTON ROSE FULBRIGHT CANADA LLP

(57) ABSTRACT

An electric power module for powering electric equipment includes: an enclosure having interconnected walls and defining an inner volume, a wall of the interconnected walls being in heat exchange relationship with an environment; a battery located within the inner volume; and a heat-conducting plate in heat exchange relationship with the battery. The heat-conducting plate has a bridge section movable between first and second positions, the bridge section being spaced apart from the wall in the first position to limit heat transfer from the battery to the environment, and the bridge section being in contact with the wall in the second position to transfer heat from the battery to the environment via the bridge section. An actuator is engaged with to the bridge section of the heat-conducting plate, the actuator being operable to move the bridge section of the heat-conducting plate between the first and second positions.

13 Claims, 4 Drawing Sheets

(51) Int. Cl.
  *H01M 10/625*   (2014.01)
  *H01M 10/63*    (2014.01)

(58) Field of Classification Search
  CPC .. H01M 10/653; H01M 10/6551; Y02T 10/70
  See application file for complete search history.

(56)      References Cited

U.S. PATENT DOCUMENTS

| | | | |
|---|---|---|---|
| 10,809,747 | B2 | 10/2020 | Andres |
| 10,868,345 | B2 | 12/2020 | Ruehle et al. |
| 2005/0074666 | A1 | 4/2005 | Kimiya et al. |
| 2015/0270588 | A1 | 9/2015 | Masias |

FOREIGN PATENT DOCUMENTS

| | | | | | |
|---|---|---|---|---|---|
| CN | 109546044 | A | * | 3/2019 | ............ H01M 50/20 |
| CN | 110143123 | A | * | 8/2019 | ........ H01M 10/6556 |
| CN | 110335981 | A | * | 10/2019 | ............. B60L 50/64 |
| CN | 110416658 | A | * | 11/2019 | .......... H01M 10/637 |
| CN | 111196182 | A | * | 5/2020 | ........... B60K 11/085 |
| CN | 111244360 | A | * | 6/2020 | ............ H01M 50/20 |
| CN | 111293247 | A | * | 6/2020 | ............ H01M 50/24 |
| CN | 111403649 | A | * | 7/2020 | ............ H01M 50/20 |
| DE | 102008034887 | | | 6/2009 | |
| GB | 2581998 | | | 9/2020 | |
| WO | WO-2008050719 | A1 | * | 5/2008 | .......... H01M 10/613 |
| WO | 2012136439 | | | 10/2012 | |

* cited by examiner

800

Modify the temperature of the battery to bring the temperature of the battery within a temperature threshold by modifying a heat flux between the wall and a heat-conducting plate in heat exchange relationship with the battery.

802

BATTERY WITH THERMAL SWITCH

CROSS-REFERENCE TO RELATED APPLICATIONS

This application claims priority from U.S. Patent Application No. 63/158,612 filed Mar. 9, 2021, the entire contents of which are incorporated by reference herein.

TECHNICAL FIELD

This disclosure relates generally to electric batteries and, more particularly, to heat control systems and methods for controlling temperature of such electric batteries.

BACKGROUND

Electric vehicles and other types of electric equipment may be powered by one or more batteries. Each battery typically include a plurality of cells that are operatively connected to one another. Such batteries generate heat when power is drawn from them. In some cases, operating batteries in temperatures exceeding a maximum temperature threshold may impede their performance and, in some cases, may damage the batteries. Similarly, performance of the batteries may decrease when they are operated at a temperate below a minimum temperature threshold. While attempts to better regulate the temperature of batteries have been made, improvements are nonetheless sought.

SUMMARY

In one aspect, there is provided an electric power module for powering electric equipment, comprising: an enclosure having interconnected walls and defining an inner volume, a wall of the interconnected walls being in heat exchange relationship with an environment outside the enclosure; a battery located within the inner volume of the enclosure; a heat-conducting plate in heat exchange relationship with the battery, the heat-conducting plate having a bridge section movable between a first position and a second position, the bridge section being spaced apart from the wall in the first position to limit heat transfer from the battery to the environment, the bridge section being in contact with the wall in the second position to transfer heat from the battery to the environment via the bridge section; and an actuator engaged with the bridge section of the heat-conducting plate, the actuator operable to move the bridge section of the heat-conducting plate between the first position and the second position.

The electric power module and/or battery as described above and herein may also include, in whole or in part, and in any combination, one or more of the following additional features.

In some embodiments, the bridge section is monolithic with a remainder of the heat-conducting plate.

In some embodiments, the bridge section resiliently moves between the first position and the second position.

In some embodiments, an at-rest state of the bridge section corresponds to one of the first position and the second position.

In some embodiments, the actuator includes a thermally-activated actuator increasing in length within the enclosure from a first length to a second length greater than the first length when a temperature in the inner volume of the enclosure exceeds a given temperature threshold.

In some embodiments, the thermally-activated actuator is operable to exert a force on the bridge section of the heat-conducting plate to move the bridge section from the first position to the second position.

In some embodiments, the actuator is located within a spacing between the battery and the bridge section of the heat-conducting plate.

In some embodiments, the actuator is engaged to a device, the device operable to translate a first movement of the actuator in a first direction into a second movement in a second direction normal to the first direction, the spacing extending in the second direction.

In some embodiments, fins are in heat exchange relationship with the wall of the interconnected walls.

In some embodiments, a coolant is flowing within coolant passages, the coolant in heat exchange relationship with the wall of the interconnected walls.

In some embodiments, the interconnected walls, but for said wall of the interconnected walls, are insulated.

In some embodiments, the heat-conducting plate forms part of the battery.

In some embodiments, the battery has a length, the heat-conducting plate in contact along a majority of the length of the battery.

In some embodiments, the heat-conducting plate is metallic.

In some embodiments, at least a portion of the heat-conducting plate is a heat pipe.

In another aspect, there is provided a battery assembly, comprising: at least one cell; a heat-conducting plate in heat exchange relationship with the at least one cell, the heat-conducting plate having a bridge section movable between a first position defining a first thermal path and a second position defining a second thermal path different from the first thermal path, thereby adapting a heat flux between the at least one cell and an environment, wherein the heat flux is greater in the second position than in the first position; and an actuator engaged with the bridge section of the heat-conducting plate, the actuator operable to move the bridge section of the heat-conducting plate between the first position and the second positions.

The battery assembly as described above and herein may also include, in whole or in part, and in any combination, one or more of the following additional features.

In some embodiments, the actuator includes a thermally-activated actuator increasing in length from a first length to a second length greater than the first length when a temperature of the actuator exceeds a given temperature threshold.

In yet another aspect, there is provided a method of regulating a temperature of a battery contained within an inner volume of an enclosure, the enclosure having a wall in heat exchange relationship with an environment outside the enclosure, the method comprising: modifying the temperature of the battery to bring the temperature of the battery within a temperature threshold by modifying a heat flux between the wall and a heat-conducting plate in heat exchange relationship with the battery.

The method as described above and herein may also include, in whole or in part, and in any combination, one or more of the following additional features.

In some embodiments, the modifying of the temperature includes decreasing the temperature of the battery by increasing the heat flux between the wall and the heat-conducting plate when the temperature of the battery is above the temperature threshold.

In some embodiments, the modifying of the temperature includes increasing the temperature of the battery by decreasing the heat flux between the wall and the heat-conducting plate when the temperature of the battery is below the temperature threshold.

In some embodiments, the modifying of the heat flux includes moving a bridge section of the heat-conducting plate until the bridge section contacts the wall to decrease the temperature of the battery or until the bridge section is spaced apart from the wall to increase the temperature of the battery.

Many further features and combinations thereof concerning the present improvements will appear to those skilled in the art following a reading of the instant disclosure.

DETAILED DESCRIPTION

Figures 1, 2:
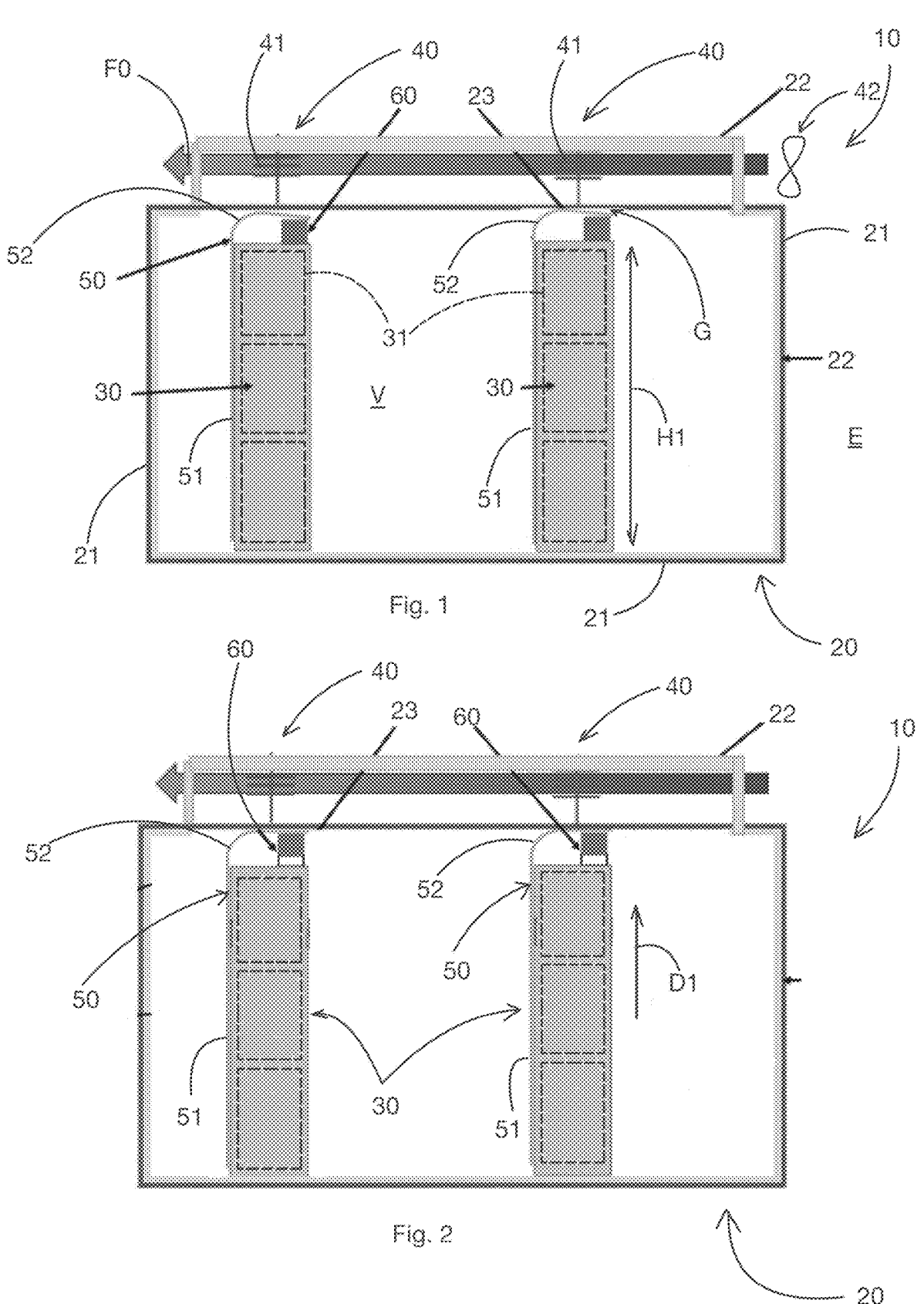
FIG. 1 is a schematic cross-sectional view of a power module in accordance with an embodiment of the present disclosure, the power module being shown in a heat-retention mode.
FIG. 2 is another schematic cross-sectional view of the power module of FIG. 1 shown in a heat-conducting mode.

Referring to FIG. 1, an electric power module (or simply "power module") is shown at 10. The power module 10 includes an enclosure 20 containing one or more electric batteries 30 (hereinafter, simply "batteries"). For simplicity's sake, only two batteries 30 are depicted within the power module 10 in FIGS. 1-2, however it is to be understood that each power module 10 may include any number of batteries 30 therewithin. Each battery 30 includes a plurality of cells 31, as shown schematically in dashed lines in FIGS. 1-2. These cells 31 are electrically interconnected to one another using known methods within each battery 30.

One or more of these power modules 10 may be used to power an electric vehicle, such as but not limited to, electric cars, electric all terrain vehicles, electric snow vehicles (e.g. snowmobiles), electric watercraft, electric aircraft, etc. Alternately, the power module 10 may be used to power other types of electric powered equipment, such as tools, etc. It may also provide stationary electric energy storage to power installations, such as buildings, communication stations, etc. or be connected to an electrical grid to store and provide electricity, such as when coupled to intermittent energy sources, such as wind turbines, photovoltaics panels, etc. Collectively, all of these electrically powered devices may be referred to herein as "electric equipment" (or simply "equipment").

As will be appreciated by those skilled in the art, the cells 31 of each battery 30 are operable to store energy and to provide an electrical potential and current when called upon. In one particular embodiment, the cells 31 and batteries 30 may operate on the basis of lithium-ion chemistry, however it should be understood that any adequate electric cell may be used.

The electric equipment powered by the power module 10 may be operated in various environmental or ambient operating conditions. For instance, if the equipment is an electric vehicle, it may need to be operated in summer and/or in winter. Performance of batteries may however be impacted by the temperature of the environment in which they operate, and in certain operating conditions, such as below-freezing winter temperatures for example, this cold operating environment can have a non-negligible impact on battery performance. It is to be understood however that temperatures that are both hotter and colder than a predefined design-point operating temperature range may negatively impact performance of the batteries 30, to a smaller or greater extent depending on how far outside this design-point operating temperature range the ambient temperature is.

As will be discussed below, the power module 10 of the present disclosure is able to vary (either passively or actively) a heat transfer flux from the batteries 30 to an environment E outside the enclosure 20. The power module 10 may therefore be able to optimize performance of the batteries 30 by selecting an optimal thermal path between the batteries 30 and the environment E. The power module 10 may therefore be better able to retain heat generated by the batteries 30 on a cold day and to expel the generated heat to the environment E on a hot day, in order to maintain the battery 30 within an ideal operating temperature range for the batteries 30. While this ideal battery operating temperature range can vary depending on the application, specific type of battery, etc., in a particular embodiment the batteries 30 and thus the power module 10 of the present disclosure may have an ideal operating temperature range of at least between 15 and 45 degrees Celsius, more particularly of between 20 and 40 degrees Celsius, and optimally about 30 degrees Celsius. It is to be understood that the exact values of each of these temperature values (either as minimums and maximums of a temperature range, or as a specific target temperature) may be within ±10% of the absolute temperature values indicated herein. While it may still be possible to operate the batteries 30 outside these ranges, efficiency and/or performance of the batteries will suffer.

The enclosure 20 of the power module 10 includes peripheral walls 21, which may be made of aluminum or any other suitable material, that are interconnected to one another to define an inner volume V. The batteries 30 are located within the inner volume V of the enclosure 20. Insulation layers 22 are disposed against the peripheral walls 21 to increase a heat resistance between the inner volume V and the environment E. One of the peripheral walls 21 is a cooled wall 23 and is in heat exchange relationship with cooling means 40. In the embodiment shown, the cooling means 40 are fins 41 secured to the cooled wall 23; the fins 41 being exposed to a cooling air flow F0 from the environment E. Therefore, heat generated by the batteries 30 and transmitted to the cooled wall 23 is conductively transmitted to the fins 41 and transmitted to the environment E by convection between the fins 41 and the cooling air flow F0. As shown in FIG. 1, the cooling means 40 are located between the cooled wall 23 and an insulation layer 22. Understandably, openings may be defined through the insulation layer 22 to allow the cooling air flow F0 to pass in a space between the insulation layer 22 and the cooled wall 23 to allow the cooling means 40 to transfer the heat picked up from the batteries 30 to the cooling air flow F0 and, subsequently, to the environment E.

It will be understood that any suitable cooling means may be used. For instance, the cooling means 40 may include a liquid coolant flowing within coolant conduits in heat exchange relationship with the cooled wall 23. The cooling means 40 may be passive cooling means, which may include fins. Alternatively, or in combination, the cooling means 40 may be active cooling means including a pumped liquid, a phase change fluid, a heat pipe, or a heat sink with a forced air system 42 (e.g., fan) to blow air from the environment E through the heat sink. The cooling means may include natural convection and/or forced convection. Any suitable cooling means may be used without departing from the scope of the present disclosure.

However, as explained above, in some cases it might be desired to increase and/or maintain a temperature of the batteries 30, by limiting heat loss therefrom. This may be desirable, for instance, for starting an electric vehicle during winter. Hence, a decrease in the heat transfer from the batteries 30 to the environment E outside the enclosure 20 is desirable for this purpose. However, in other situations, for instance during a hot summer day, maximising the heat transfer between the batteries 30 and the environment E is desired. The power module 10 of the present embodiment is accordingly equipped with an integrated system that allows a thermal resistance between the batteries 30 and the environment E to be selectively increased or decreased, such as to maintain temperature within the above-mentioned ideal battery temperature range for optimum efficiency and/or performance.

As shown in FIG. 1, the batteries 30 are in heat exchange relationship with heat-conducting plates 50. In one particular embodiment, the heat-conducting plates 50 may be made of a high thermally conductive material, such as a suitable metallic material (e.g. aluminum, or other suitable alloys). In another particular embodiment, at least a portion of the heat-conducting plates may be formed as a heat pipe. In the embodiment shown, a number of batteries 30 equates a number of the heat-conducting plates 50, but other configurations are contemplated without departing from the scope of the present disclosure. As shown in FIG. 1, first sections 51 of the heat-conducting plates 50 are in heat exchange relationship with the batteries 30 by being each in contact with a respective one of the batteries 30. It will be appreciated that, alternatively, the heat-conducting plates 50 may be in heat exchange relationship with the batteries 30 via any other suitable means, such as via a liquid coolant and/or heat exchanger. The heat-conducting plates 50 may be directly in contact against the batteries 30 such that a surface of each of the heat-conducting plates 50 directly touches a surface of a casing of the batteries 30; the casing containing the cells 30*a*. In some cases, a thermally-conductive adhesive may be disposed between the heat-conducting plates 50 and the casing containing the cells 30*a*. In some cases, the heat-conducting plates 50 form part of the batteries. They may define a portion of a casing of a battery; the casing enclosing the cells 30*a*. Each of the cells 30*a* may be in contact, either directly or via a thermally-conductive adhesive, with a heat-conducting plate.

As shown, the batteries 30 have a height H1. A length of a contact between the first sections 51 of the heat-conducting plates 50 and the batteries 30 covers a majority of the height H1 of the batteries. Herein, the expression "majority" entails 50% or more. The heat-conducting plates 50 may also extend over a majority of a depth of the batteries 30. The heat-conducting plates 50 may extend over a face of the batteries 30 having the greatest surface area. The heat-conducting plates 50 may, in an alternate embodiment, wrap around the batteries 30 or be inserted between and/or within the batteries.

Referring to FIGS. 1-2, the heat-conducting plates 50 have second sections 52, also referred to herein as bridge sections, that are integral with the first sections 51 and protrude therefrom. Hence, the first and second sections 51, 52 of the heat-conducting plates 50 are in heat exchange relationship with one another. In the present embodiment, heat may be exchanged between the first and second sections 51, 52 of the heat-conducting plates 50 via conduction. The bridge sections 52 of the heat-conducting plates 50 are, when disposed in a first position as shown in FIG. 1, free from contact with the cooled wall 23 and therefore spaced apart therefrom (i.e. an air gap is defined between the cooled wall 23 and the bridge sections 52). The power module 10 is shown in a heat-retention mode in FIG. 1 and in a heat-conducting mode in FIG. 2. In the heat-retention mode of FIG. 1, the second sections 52 of the heat-conducting plates 50 are spaced apart from the cooled wall 23 by gaps G. Therefore, in the heat-conducting mode, heat generated by the batteries 30 is conductively transferred from the batteries 30 to the heat-conducting plate 50 via the contact between the batteries 30 and the heat-conducting plates 50. The heat is then conductively transferred along the heat-conducting plate 50 toward regions of the heat-conducting plates 50 that are colder. In the present case, the second sections 52 of the heat-conducting plates 50 may be colder than the first sections 51 because the second sections 52 are not in contact with the batteries 30.

In the heat-retention mode of the power module 10 as depicted in FIG. 1, the heat reaches the second sections 52 of the heat-conducting plates 50. However, heat has to travel the gaps G between the second sections 52 of the heat-conducting plates 50 to reach the cooled wall 23. A thermal resistance across an air gap is such that heat tends to remain in the enclosure by being transferred to the air inside the inner volume V by convection rather than being transferred to the cooled wall 23. It is understood that even in the heat-retention mode of FIG. 1, a portion of heat that is transferred to the air of the inner volume V by convection may also be transferred to the cooled wall 23 by convection and/or radiation. However, it is expected that a heat flux from the second sections 52 of the heat-conducting plates 50 across the gaps G is smaller than a heat flux from the second sections 52 to the air inside the inner volume V of the enclosure 20.

Referring more particularly to FIG. 2, in the heat-conducting mode, the second sections 52 of the heat-conducting plates 50 are moved from the first position depicted in FIG. 1 to a second position depicted in FIG. 2. In the second position of the heat-conducting plates 50, the second sections 52 are in contact with the cooled wall 23. In such a position, the heat that has reached the second sections 52 of the heat-conducting plates 50 tends to follow a path of least resistance and, consequently, is transferred conductively to the cooled wall 23 across the contacts between the second sections 52 of the heat-conducting plates 50 and the cooled wall 23. Therefore, a thermal resistance between the second sections 52 of the heat-conducting plates 50 and the cooled wall 23 is greater in the first position of FIG. 1 than it is in the second position of FIG. 2. Thus, a heat flux from the second sections 52 of the heat-conducting plates 50 to the cooled wall 23 is greater in the second position of FIG. 2 than it is in the first position of FIG. 1. In a particular embodiment, a thermal resistance between the second sections 52 and the cooled wall 23 is about 20 times higher in the first position of the second sections 52 where the gas G separate them than in the second position of the second sections when they are contacting one another.

It will be understood that, in the heat-conducting mode, a heat flux between the batteries 30 and the cooled wall 23 is maximised. In a particular embodiment, the heat-conducting mode may be used to warm up the batteries 30 by increasing a temperature of wall 23, which may be then referred as a heated wall. This may be done, for instance, by flowing a heated liquid in heat exchange relationship with the wall 23 and/or by heating the wall 23 with a heater (e.g., electric resistive heating). This heating approach may allow heat to be efficiently distributed throughout the power module 10 without requiring heating elements to be embedded inside the enclosure 20. It may also allow heating of the batteries 30 from an external heat source by bringing the heat in contact with the wall 23.

In the embodiment shown, the heat-conducting plates 50 are resiliently moved (i.e. elastically deformed) from the first position to the second position by bending the second sections 52. Therefore, the first sections 51 and the second sections 52 of the heat-conducting plates 50 are monolithic with one another. Alternatively, the second sections 52 may be hingedly connected to the first sections 51 such that the second sections 52 are movable between the first and second positions. In the present case, an at-rest position of the heat-conducting plates 50 corresponds to the first position in which the second sections 52 are spaced apart from the cooled wall 23 by the gaps G. A force is therefore required to bias the second sections 52 from their first position to their second position to create the contact with the cooled wall 23. Alternatively, the at-rest position may correspond to the second position in which the second sections 52 are in contact with the cooled wall 23. In this alternative, a force is required to remove the contact and create the air gap G between the second sections 52 and the cooled wall 23. The heat-conducting plates 50 may be designed such that their at-rest positions correspond to a position in which they are expected to be a majority (more than 50%) of the time.

In the heat-retention mode of FIG. 1, heat generated by the batteries 30 is substantially kept inside the enclosure 20 such that this heat is available to increase a temperature of the batteries 30 until the batteries reach their optimal operating temperatures. When the temperature inside the enclosure 20 becomes too high, the second sections 52 of the heat-conducting plates 50 may be moved from their first position of FIG. 1 to their second position of FIG. 2 to increase a heat flux to the cooled wall 23. The heat may then be dissipated in the environment E by the cooling means 40 as described herein above.

Still referring to FIGS. 1-2, in the embodiment shown, actuators 60 are used to move the second sections 52 of the heat-conducting plates 50 between the first and second positions. In the depicted embodiment, the actuators 60 are located between the second sections 52 of the heat-conducting plates 50 and the batteries 30. The actuators 60 may be engaged to both of the batteries 30 and the second sections 52. Alternatively, the actuators may be engaged to the second sections 52 of the heat-conducting plates 50 and to one or more of the peripheral walls 21, 23 of the enclosure 20. Any suitable positions of the actuators 60 are contemplated. The actuators 60 are operable to move the second sections 52 along direction D1 (FIG. 2) to create the contact between the second sections 52 and the cooled wall 23. It will be appreciated that, alternatively, the actuators 60 may be engaged to the batteries 30 and to one or more of the peripheral walls 21 such that, when actuated, the actuators 60 move the batteries 30, and the heat-conducting plates 50 secured thereto, along the direction D1 to create the contact between the second sections 52 and the cooled wall 23.

In the embodiment shown, the second sections 52 of the heat-conducting plates 50 have a portion substantially parallel to the cooled wall 23 when the second sections 52 are in the second position depicted in FIG. 2 such that a contact surface area is created between the cooled wall 23 and the second sections 52 of the heat-conducting plates 50. It will be appreciated that the greater this contact surface area is, the higher is the thermal heat flux from the batteries 30 to the cooled wall 23 and, subsequently, to the environment E via the cooling means 40.

The actuators 60 act as thermal switches to selectively enable heat transfer between the batteries 30 and the cooled wall 23. As shown in FIGS. 1-2, the actuators 60 are not in a heat path from the batteries 30 to the cooled wall 23. In other words, upon the power module 10 operated in the heat-conducting mode of FIG. 2, and in which the second sections 52 of the heat-conducting plate 50 are in contact with the cooled wall 23, the heat travels along the heat-conducting plate 50 and from said plates to the cooled wall 23 without going through the actuators 60. Therefore, the disclosed power module 10 may allow an efficient heat transfer from the batteries 30 to the cooled wall 23 while bypassing the actuators 60. Hence, a thermal resistance of the actuators 60 may not affect the heat transfer provided by the heat-conducting plate 50. The ability to "disconnect" thermally the batteries 30 from the cooled wall 23 may offer a reduced warm-up time of the batteries 30 compared to a configuration where the cooling means 40—in the case where a liquid coolant is used—are deactivated by, for instance, stopping a flow of the liquid coolant in the coolant conduits in heat exchange relationship with the cooled wall 23.

Figures 3, 4, 5:
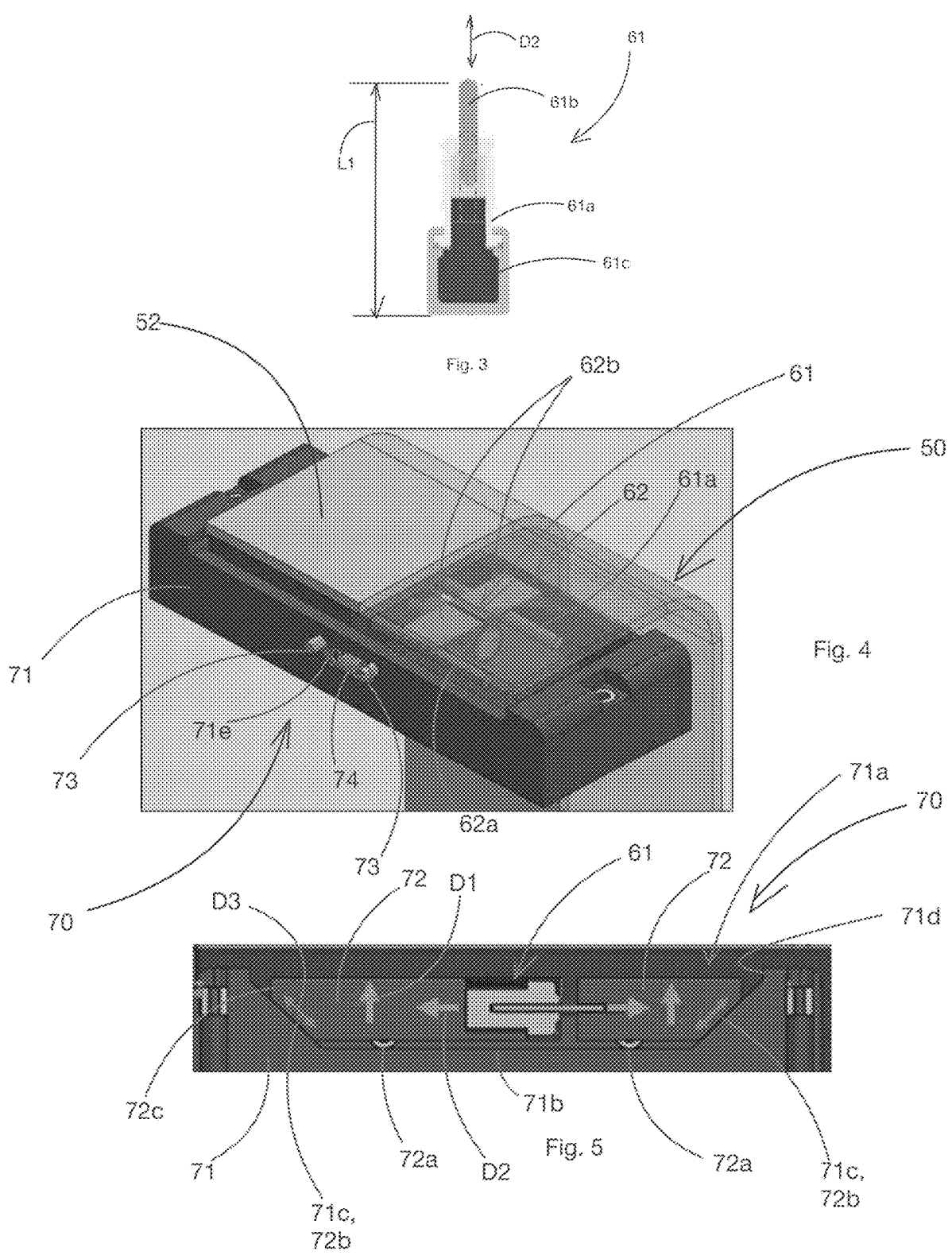
FIG. 3 is a cross-sectional view of a thermally-activated actuator in accordance with an embodiment, used in the power module of FIG. 1.
FIG. 4 illustrates a top three dimensional, partially transparent, view of a portion of the power module of FIG. 1, illustrating a heat-conducting plate and an actuator.
FIG. 5 is a cross-sectional view of an actuator in accordance with one embodiment to be used by the power module of FIG. 1, and including the thermally-activated actuator of FIG. 3.

Referring now to FIG. 3, in the embodiment shown, the actuators 60 include each a thermally-activated actuator 61, also referred to as a wax motor, wax actuator, or thermally-triggered mechanical actuator. The thermally-activated actuator 61 includes a housing 61a and a shank 61b slidably received within the housing 61a and movable in relationship to the housing 61a about direction D2, which is substantially parallel to a central axis of the shank 61b. The housing 61a contains a heat-expandable medium 61c, which may be wax designed to expand over a designed temperature range. The heat-expandable medium 61c increases in volume when exposed to a temperature greater than a given threshold (e.g., 27 degrees Celsius). The thermally-activated actuator 61 is shown in an expanded position in FIG. 3; the contracted position being illustrated with a dashed line. Therefore, when the thermally-activated actuator 61 is exposed to the temperature greater than the given threshold, the shank 61b moves about direction D2 in relationship to the housing 61a to increase an effective length L1 of the thermally-activated actuator 61. In an embodiment, the thermally-activated actuator 61 starts to expand from the collapsed position to the extended position at a temperature of between 20 and 30 degrees Celsius. A load generated by the thermally-activated actuator 61 during its expansion may be about from 30 to 40

Newton, 33 Newton in some embodiments. Its variation in effective length L1 may be about 4 mm, and may be about 2.5 mm between 25 and 30 degrees Celsius. In some cases, 70% of the change in effective length L1 occurs between 25° C. and 30° C. A contact force generated between the second sections 52 and the cooled wall 23 by the thermally-activated actuator 61 may be about 10 kPa. Such a pressure may ensure a suitable thermal contact between the heat-conducting plate 50 and the cooling means 40. In the present disclosure, the expression "about" implies a variation of plus or minus 10%.

However, for space concerns, it may be desired to keep a dimension of the gaps G (FIG. 1) between the heat-conducting plates 50 and the cooled wall 23 as small as possible. This may allow to maximise a size of the batteries 30 contained within an enclosure of a certain dimension. In such case, the effective length L1 of the thermally-activated actuator 61, even when in the retracted position, may be too great to fit between the second sections 52 of the heat-conducting plates 50 and the batteries 30. For this purpose, devices are proposed here to accept the thermally-activated actuator 61 in a position in which the effective length L1 extends substantially transversally to the direction D1, and substantially parallel to the second sections 52 of the heat-conducting plates 50. The devices are used to translate elongation or contraction of the thermally-activated actuator 61 in the direction D2 in to a movement of the second sections 52 of the heat-conducting plates 50 in the direction D1, which in a particular embodiment is normal to the direction D2.

In a particular embodiment, the thermally-activated actuator 61 may be disposed at a different angle such that directions D1 and D2 are not normal to one another. For instance, thermally-activated actuator 61 may be tilted (e.g., 30 degrees relative to the direction D1) so that a portion of its shank 61*b* is normal to the second sections 52. The housing 61*a* of the thermally-activated actuator 61 may be secured to one of the second sections 52 and one of the batteries 30 whereas a tip of the shank 61*b* may be in abutment against the other of the second sections 52 and the one of the batteries 30. Elongation of the thermally-activated actuator 61 results in the tip of the shank 61*b* sliding against the other of the second sections 52 and the one of the batteries 30 while decreasing a dimension of the gap G.

Referring now to FIGS. 4-5, an exemplary embodiment of a device is shown at 70. An exemplary implementation of the device 70 in relation to the heat-conducting plates 50 is shown in FIG. 4. The device 70 includes a casing 71 that may be secured to one of the batteries 30 using any suitable fastening means, such as screws. The casing 71 defines a cavity 71*a* sized to receive bogies 72, two in the embodiment shown. The cavity 71*a* is defined partially by a bottom wall 71*b* and two side walls 71*c* extending from the bottom wall 71*b* from respective ends thereof. The two side walls 71*c* extend in a direction having a component in the direction D1 and are non-parallel to one another. That is, the two side walls 71*c* flare away from one another from the bottom wall 71*b* and away therefrom.

Each of the two bogies 72 is engaged to a respective one of the housing 61*a* and the shank 61*b* of the thermally-activated actuator 61 described above with reference to FIG. 3. The bogies 72 are rollingly engaged to the bottom wall 71*b* of the casing 71 via wheels 72*a*. Alternatively, the two bogies 72 may be simply in a sliding engagement against the bottom wall 71*b* of the casing 71. Each of the two bogies 72 defines a body having an outer wall 72*b* being substantially parallel to a respective one of the two side walls 71*c* of the casing 71. In use, when the effective length L1 of the thermally-activated actuator 61 increases in the direction D2, the outer wall 72*b* of each of the bogies 72 becomes in abutment against the two side walls 71*c* of the casing 71 and the outer wall 72*b* of each of the bogies 72 slides against the side walls 71*c* of the casing 71 along direction D3. This translates in the two bogies 72 moving upwardly along direction D1. As the two bogies 72 are engaged to the second sections 52 of the heat-conducting plate 50, the two bogies 72 push the second sections 52 along the direction D1 to bridge the gaps G between the cooled wall 23 (FIG. 1) and the second sections 52 to increase the heat flux between the batteries 30 (FIG. 1) and the cooled wall 23.

In the depicted embodiment, the bogies 72 define first shoulders 72*c* extending from the outer walls 72*b*, and the casing 71 define second shoulders 71*d* extending from the two side walls 71*c*. The first shoulders 72*c* and the second shoulders 71*d* are substantially vertical and parallel to the direction D1. When the thermally-activated actuator 61 is in its expanded position, the first shoulders 72*c* of the bogies 72 may become in abutment against the second shoulders 71*d* of the casing 71 to limit further movements of the bogies 72 in relationship to the casing 71.

In the embodiment shown, the housing 61*a* of the thermally-activated actuator 61 is in heat exchange relationship with the batteries 30 via the second sections 52 of the heat-conducting plates 50 and via a heat-transfer sheet 62. In the embodiment show, the heat-transfer sheet 62 includes a portion 62*a* circumferentially wrapped around the housing 61*a* of the thermally-activated actuator 61 and two fins 62*b* extending from the portion 62*a* and extending away from one another. The two fins 62*b* are in thermal contact against the second sections 52 of the heat-conducting plates 50. The heat-transfer sheet 62 may be made of copper or any other suitable material. The heat-transfer sheet 62 may be a single rectangular sheet having a central portion wrapped around the thermally-activated actuator 61 and end portions extending away from the central portion to define the two fins 62*b*. Hence, in the embodiment shown, the thermally-activated actuator 61 is in heat exchange relationship with the batteries 30 via the heat-conducting plates 50 and via the heat-transfer sheet 62. This may ensure that the thermally-activated actuator 61 is substantially at a same temperature as the second sections 52 of the heat-conducting plates 50.

Referring more particularly to FIG. 4, each of the bogies 72 may be engaged to a pin 73 slidably received within a correspondingly sized slot 71*e* defined through the casing 71. A biasing member 74, such as a spring, is engaged to both of the pins 73 to bias the bogies 72 toward one another. Therefore, when a temperature drops below a given threshold, the thermally-activated actuator 61 may revert to its collapsed position and the biasing member 74 is used to bias the bogies 72 toward one another to move them downwardly along the direction D1 and toward the bottom wall 71*b* of the casing 71 to allow the second section 52 of the heat-conducting plate 50 to move back toward its first position in which it is spaced apart from the cooled wall 23 by the gap G. Similar pins and spring may be located on an opposite side of the casing 71 if more biasing force is required and for symmetrical forces.

Figures 6, 7:
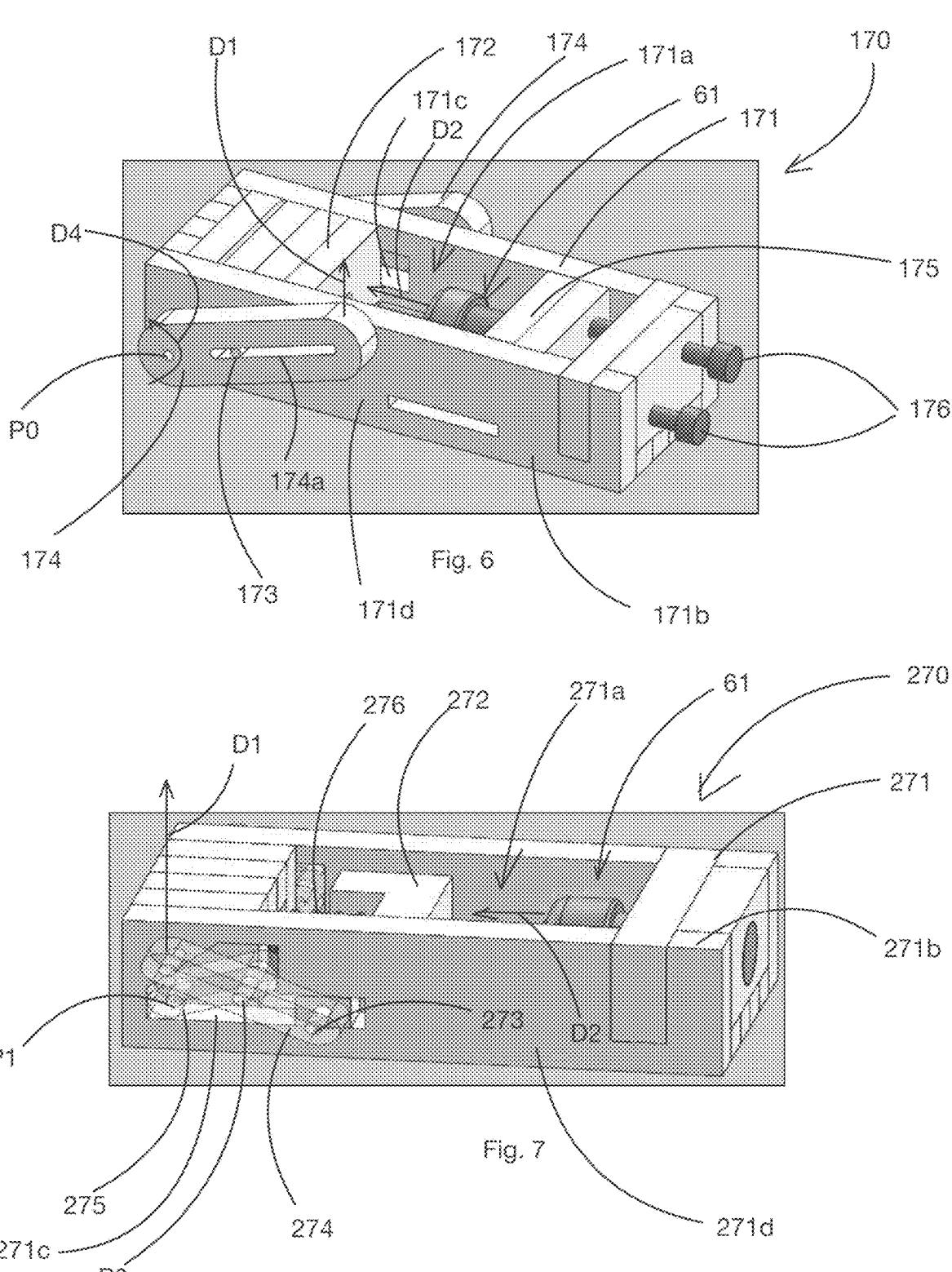
FIG. 6 is a three dimensional view of an actuator in accordance with another embodiment to be used in the power module of FIG. 1, and including the thermally-activated actuator of FIG. 3.
FIG. 7 is a three dimensional view of an actuator in accordance with another embodiment to be used in the power module of FIG. 1, and including the thermally-activated actuator of FIG. 3.

Referring now to FIG. 6, another embodiment of a device is shown at 170. The device 170 includes a casing 171 defining a cavity 171*a* surrounded by side walls 171*b* and sized to receive the thermally-activated actuator 61. The thermally-activated actuator 61 is engaged to one of the side walls 171*b* and to a moving plate 172. The moving plate 172 is slidably received within the cavity 171*a* of the casing 171 and is movable along direction D2 corresponding to a direction of elongation/contraction of the thermally-activated actuator 61. The moving plate 172 is engaged to two pins 173 each slidably received within a correspondingly shaped slot 171c defined by opposed lateral walls 171d of the side walls 171b of the casing 171. The device 170 includes two arms 174 each pivotally connected to a respective one of the opposed lateral walls 171d of the side walls 171b of the casing 171. Each of the two arms 174 defines a longitudinal slot 174a that is sized to accept a respective one of the two pins 173.

In use, when the thermally-activated actuator 61 is exposed to a temperature above a given temperature threshold, its effective length L1 (FIG. 3) increases from its collapsed position to its extended position thereby pushing against the moving plate 172 to move said plate along the direction D2 in relationship to the casing 171. The moving of the moving plate 172 induces movements of the two pins within the slots 171c of the casing 171 and within the longitudinal slots 174a of the two arms 174. As such, and since a distance between a pivot point P0 of the two arms 174 and a bottom of the casing 171 is less than a distance between the two pins 173 and the bottom of the casing 171, this movement causes the two arms 174 to rotate about the pivot point P0 along a direction D4. Distal ends of the two arms 174 thereby move upwardly along the direction D1. The distal ends of the two arms 174 may be engaged to the second sections 52 (FIG. 1) of the heat-conducting plates 50 to bias the second sections 52 (FIG. 1) of the heat-conducting plates 50 against the cooled wall 23 (FIG. 1). These movements are reversed when the thermally-activated actuator 61 moves from its expanded position to its collapsed position following a temperature decrease below a certain threshold to create the gaps G (FIG. 1) between the heat-conducting plates 50 and the cooled wall 23. Although not illustrated, a biasing member may be used to bias the thermally-activated actuator 61 back toward its collapsed position.

In the depicted embodiment, the thermally-activated actuator 61 is held in place in relationship to the casing 171 by a support plate 175 that is received within the cavity 171a of the casing 171. Adjusting screws 176 may be threadingly engaged to an end wall of the side walls 171b of the casing 171 and in abutment against the support plate 175. Rotation of the adjusting screws 176 allows to slidably move the support plate 175 and the thermally-activated actuator 61 secured thereto to change a distance between the thermally-activated actuator 61 and the moving plate 172 for fine tuning purposes. It will be appreciated that, alternatively, shims may be used to vary this distance without departing from the scope of the present disclosure.

Referring now to FIG. 7, another embodiment of a device is shown at 270. The device 270 includes a casing 271 defining a cavity 271a surrounded by side walls 271b and sized to receive the thermally-activated actuator 61. The thermally-activated actuator 61 is engaged to one of the side walls 271b and to a moving plate 272. The moving plate 272 is slidably received within the cavity 271a of the casing 271 and is movable along direction D2 corresponding to a direction of elongation/contraction of the thermally-activated actuator 61. The moving plate 272 is engaged to two pins 273 each slidably received within a correspondingly shaped slots 271c defined by opposed lateral walls 271d of the side walls 271b of the casing 271. The device 270 includes two first arms 274 each disposed adjacent a respective one of the opposed lateral walls 271d and each pivotally connected to a respective one of the two pins 273. Two second arms 275 are each pivotably connected to a respective one of the opposed lateral walls 271d at first pivot points P1 at a first ends of the second arms 275. Second, opposed ends of the second arms 275 are pivotally connected at second pivot points P2 to the first arms 274 between the two pins and distal ends of the first arms 274.

In use, when the thermally-activated actuator 61 is exposed to a temperature above a given temperature threshold, its effective length L1 (FIG. 3) increases from its collapsed position to its extended position thereby pushing against the moving plate 272 to move said plate along the direction D2 in relationship to the casing 271. The moving of the moving plate 272 induces movements of the two pins 273 within the slots 271c of the casing 271. In turn, this induces a pivoting motion of the first arms 274 relative to the second arms 275 about the second pivot points P2 and a pivoting motion of the second arms 275 about the first pivot points P1 in relationship to the casing 271. Following elongation of the thermally-activated actuator 61, the two pins 273 become closer to the first pivot points P1, which moves the second pivot points P2 vertically away from a bottom of the casing 271 thereby inducing a movement of the distal ends of the first arms 274 in the direction D1 to bias the second sections 52 (FIG. 1) of the heat-conducting plates 50 against the cooled wall 23 (FIG. 1). These movements are reversed when the thermally-activated actuator 61 moves from its expanded position to its collapsed position following a temperature decrease below a certain threshold to create the gaps G (FIG. 1) between the heat-conducting plates 50 and the cooled wall 23.

A biasing member 276 may be disposed within the cavity 271a of the casing 271 between an end wall of the side walls 271b and the moving plate 272. The biasing member 276, which may be a spring, is used to bias the moving plate 272 toward the thermally-activated actuator 61 when the latter moves from the expanded position back to the collapsed position following the temperature dropping below a certain temperature threshold to create the gaps G (FIG. 1) between the heat-conducting plates 50 and the cooled wall 23.

Referring to FIGS. 4-7, the devices 70, 170, 270 are sized accordingly to be received within the gaps G between the second sections 52 of the heat-conducting plates 50 and the cooled wall 23 and to maximise sizes of the batteries 30 to be received in the enclosure 20 of the power module 10. The devices 70, 170, 270 are used to transform the displacement of the wax motor's pin to a pressure evenly applied on the moving part of the heat-conducting plates 50. The devices 70, 170, 270 may be made of laser-cut acrylic, or they may be 3D-printed out of polylactic acid (PLA) and/or polyethylene terephthalate glycol (PETG). The devices 70, 170, 270 may be made of any suitable materials, such as any suitable polymers. Air alveolus may be used in the materials chosen for the manufacturing of the devices for weight savings purposes and for decreasing a heat flux through the devices 70, 170, 270. The casings of the devices 70, 170, 270 may be secured to the heat-conducting plates 50 or to the batteries 30.

Figure 8:
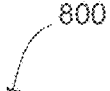
FIG. 8 is a flowchart illustrating a step of a method of regulating a temperature of a battery.

Referring now to FIG. 8, a method of regulating the temperature of the battery 30 is shown at 800. The method 800 includes modifying the temperature of the battery 30 to bring the temperature of the battery 30 within a temperature threshold by modifying a heat flux between the cooled wall 23 and the heat-conducting plate 50 in heat exchange relationship with the battery 30 at 802.

In the embodiment shown, the modifying of the temperature includes decreasing the temperature of the battery 30 by increasing the heat flux between the wall 23 and the heat-conducting plate 50 when the temperature of the battery 30 is above the temperature threshold. In the depicted embodiment, the modifying of the temperature includes increasing the temperature of the battery 30 by decreasing the heat flux between the wall 23 and the heat-conducting plate 50 when the temperature of the battery 30 is below the temperature threshold.

In the present embodiment, the modifying of the heat flux includes moving the second section 52 of the heat-conducting plate 50 until the second section 52 contacts the wall 23 to decrease the temperature of the battery 30 or until the second section 52 is spaced apart from the wall 23 to increase the temperature of the battery 30.

It will be appreciated that the thermally-activated actuator 61 may be replaced by any suitable actuators operable to move the second sections 52 of the heat-conducting plates 50 between their first and second positions. For instance, a pneumatic actuator, a solenoid, a hydraulic actuator, a linear actuator, a thermally-activated bimorph, or any other actuation means may be used without departing form the scope of the present disclosure. Understandably, if an actuator that is not thermally-activated is used, the power module 10 may be equipped with a controller including a processing unit and a computer-readable medium having instructions stored thereon executable by the processing unit for determining a temperature in the inner volume V of the enclosure 20 and for actuating the actuator to move the heat-conducting plates 50 between their first and second positions. The determining of the temperature may include receiving data from a sensor operatively connected to the controller of the power module 10. In some embodiments, the actuator may be operatively connected to a user-engageable switch. The user, for instance of the electric vehicle, may manually trigger the actuator via the switch to select which of the modes (cooling vs. heating) of the power module 10 is the most suitable in function of the operating conditions in the environment E. In some cases, the electric vehicle (or any other device requiring the need of the power module 10), may have a system indicating to the user (e.g., a light indicator) that the power module 10 may be operated in the heat-retention mode or in the heat-conducting mode.

The power module 10 as disclosed herein may be affordable, may include a limited number of moving parts, may be manufactured via 3D printing techniques, may allow for an embedded fixation system, may be fastened to the cooled wall 23 for a reduction of a tolerance stack up. In a particular embodiment, the thermally-adaptable power module may reduce heat loss when operated in the heat-retention mode, to the point where only 1% of a capacity of the batteries 30 may be lost for electrical heating to maintain the pack at 10° C. This may correspond to a 16 time and 4 time improvement over the passive and active cooling configurations, respectively. Each cell or module in the battery pack may be independently equipped with its actuator 60 dedicated to it and heat-conducting plate 50 for allowing passive and independent temperature regulation at the cell level. Alternatively, to reduce costs and weight, a simple thermal switch can be used for all batteries 30. A device may be used to accept one or more actuator and may be sized to span all of the second sections 52 of the heat-conducting plates 50 to move said second sections 52 in unison upon elongation of the one or more actuator.

The disclosed power module 10 may offer a passive adaptive thermal path, in that the thermal path can be modified by the power module 10 such as to either retain heat or dissipate heat, as may be required. The disclosed power module 10 may enable and disable heat exchange between the batteries 30 and the environment E outside the enclosure 20 as a function of the cell temperature. This may allow the power module 10 to properly cool down the cells 30a in hot ambient temperature, heat cells more quickly in winter conditions by reducing heat loss, as well as retain heat for extended periods of time during vehicle parking, leading to less energy consumption for self-heating. The impact of this thermal management method on the battery pack may increase driving range in winter, extend cell lifetime, reduce range anxiety, and improve safety. The disclosed system may be seen as a temperature regulator that may be set to maintain a desired temperature. While the vehicle is operating, disabling heat exchange between the batteries 30 and the environment E may allow the heat generated by the batteries 30 to accumulate within the pack, bringing the temperature up quickly until it reaches the threshold temperature. Once the in the heat-conducting mode, heat is dissipated to the environment via the cooling means 40. This may contribute in keeping the cells 30a in the optimum operating temperature. Once the vehicle is turned off in winter, the ambient environment E may cool down the batteries 30 until they reaches a given set point and, at which point, the thermal path is then deactivated to create the gaps G as explained above. Combined with proper thermal insulation around the enclosure 20, the disclosed power module 10 may reduce the amount of energy needed to bring the batteries 30 to the optimal operating temperature, and may increase an autonomy of the vehicle in cold climates.

As can be seen therefore, the examples described above and illustrated are intended to be exemplary only. The scope is indicated by the appended claims.

What is claimed is:

1. A method of regulating a temperature of a battery contained within an inner volume of an enclosure, the enclosure having a wall in heat exchange relationship with an environment outside the enclosure, the method comprising:

modifying the temperature of the battery to bring the temperature of the battery within a temperature threshold by modifying a heat flux between the wall and a heat-conducting plate in heat exchange relationship with the battery, including:

transferring heat from a base section of the heat-conducting plate being in heat exchange relationship with the battery to a bridge section of the heat-conducting plate being spaced apart from the battery, and creating one of a contact and a gap between the bridge section and the wall by moving the bridge section relative to the base section.

2. The method of claim 1, wherein the modifying of the temperature includes decreasing the temperature of the battery by increasing the heat flux between the wall and the heat-conducting plate when the temperature of the battery is above the temperature threshold.

3. The method of claim 1, wherein the modifying of the temperature includes increasing the temperature of the battery by decreasing the heat flux between the wall and the heat-conducting plate when the temperature of the battery is below the temperature threshold.

4. The method of claim 1, wherein the bridge section is movable between a first position and a second position, the bridge section being spaced apart from the wall in the first position to limit heat transfer from the battery to the environment, the bridge section being in contact with the wall in the second position to transfer heat from the battery to the environment via the bridge section.

5. The method of claim 4, further comprising using an actuator engaged to the bridge section of the heat-conducting plate to move the bridge section of the heat-conducting plate between the first position and the second position.

6. The method of claim 5, wherein the actuator includes a thermally-activated actuator, the using the actuator further comprising increasing the thermally-activated actuator in length from a first length to a second length greater than the first length when a temperature in the inner volume of the enclosure exceeds a given temperature threshold.

7. The method of claim 6, further comprising exerting a force on the bridge section of the heat-conducting plate using the thermally-activated actuator to move the bridge section from the first position to the second position.

8. The method of claim 5, further comprising locating the actuator within a spacing between the battery and the bridge section of the heat-conducting plate.

9. The method of claim 8, wherein the actuator is engaged to a device, the method further comprising using the device to translate a first movement of the actuator in a first direction into a second movement in a second direction normal to the first direction, the spacing extending in the second direction.

10. The method of claim 4, further comprising resiliently moving the bridge section between the first position and the second position.

11. The method of claim 1, further comprising forming the bridge section monolithically with a remainder of the heat-conducting plate.

12. The method of claim 1, further comprising providing at least a portion of the heat-conducting plate as a heat pipe.

13. The method of claim 1, further comprising forming the enclosure from interconnected walls, the interconnected walls including said wall in heat exchange relationship with an environment outside the enclosure, all of the interconnected walls but for said wall being insulated.

* * * * *